(12) United States Patent
Rapowitz et al.

(10) Patent No.: US 12,299,511 B1
(45) Date of Patent: May 13, 2025

(54) TRANSACTION CARD WITH A REMOVABLE WEIGHT

(71) Applicant: Capital One Services, LLC, McLean, VA (US)

(72) Inventors: Samuel Rapowitz, Atlanta, GA (US); Bryant Yee, Silver Spring, MD (US); Armando Martinez Stone, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/505,568

(22) Filed: Nov. 9, 2023

(51) Int. Cl.
*G06K 19/04* (2006.01)

(52) U.S. Cl.
CPC .................. *G06K 19/044* (2013.01)

(58) Field of Classification Search
CPC ...................................................... G06K 19/044
See application file for complete search history.

(56) References Cited

U.S. PATENT DOCUMENTS

| | | | | |
|---|---|---|---|---|
| 4,141,400 | A * | 2/1979 | Mangan | A45C 11/182 206/39.6 |
| 4,711,347 | A * | 12/1987 | Drexler | A45C 11/182 281/31 |
| 5,234,351 | A * | 8/1993 | Dixon | H05K 5/0265 439/152 |
| 7,213,749 | B2 * | 5/2007 | Webb | G11B 7/24 720/719 |
| 7,523,870 | B2 * | 4/2009 | Lowe | A45C 11/18 242/379 |
| 8,302,858 | B2 | 11/2012 | Eng | |
| 9,907,375 | B1 | 3/2018 | Kitchen | |
| 11,564,466 | B2 | 1/2023 | Clarete et al. | |
| 2005/0001041 | A1 * | 1/2005 | McCarthy | A45C 13/18 235/492 |
| 2005/0077348 | A1 * | 4/2005 | Hendrick | G06K 7/0021 235/382 |
| 2005/0194450 | A1 * | 9/2005 | Webb | G07F 7/086 235/487 |
| 2006/0208066 | A1 * | 9/2006 | Finn | H04H 60/74 235/441 |
| 2007/0267502 | A1 * | 11/2007 | Zellner | G06K 19/06187 235/487 |
| 2008/0083829 | A1 * | 4/2008 | Lowe | A45F 5/004 235/380 |

(Continued)

*Primary Examiner* — Thien M Le
*Assistant Examiner* — Asifa Habib
(74) *Attorney, Agent, or Firm* — Bookoff McAndrews, PLLC (57) ABSTRACT

A transaction card assembly is disclosed, comprising a card body, an EMV chip, visible cardholder information, and a receiving portion disposed on the card body; a weighted card component comprising an attachment portion, the weighted card component being heavier than the card body and wherein, in a first configuration, the weighted card component is coupled to the card body via engagement between the receiving portion and the attachment portion, and in a second configuration, the weighted card component is uncoupled from the card body by disengagement between the attachment portion and the receiving portion, and wherein, in the first configuration, the weighted card component obfuscates the EMV chip and the visible cardholder information.

19 Claims, 6 Drawing Sheets

(56) References Cited

U.S. PATENT DOCUMENTS

| | | | |
|---|---|---|---|
| 2009/0236430 A1* | 9/2009 | Webb | G11B 7/24 235/492 |
| 2013/0168463 A1* | 7/2013 | Dobler | A61L 9/12 239/34 |
| 2015/0208777 A1* | 7/2015 | McMillian | A45C 11/182 206/216 |
| 2015/0208778 A1* | 7/2015 | Velentzas | A45C 11/182 150/147 |
| 2015/0335118 A1* | 11/2015 | Van Geer | A45C 11/182 150/147 |
| 2020/0060402 A1* | 2/2020 | McCarty | A45C 11/182 |
| 2020/0138157 A1* | 5/2020 | Adelman | A45C 11/00 |

* cited by examiner

TRANSACTION CARD WITH A REMOVABLE WEIGHT

TECHNICAL FIELD

Various embodiments of the present disclosure relate generally to payment or other transaction cards and, more particularly, to transaction cards having a a removable and replaceable weighted card component.

BACKGROUND

Transaction cards are often composed of a weighted, often metal, material to add substance and weight to the card. Many cardholders have a preference for the weighted cards, but they come with accompanying challenges. For instance, the increased weight and thickness associated with these transaction cards limits the number of cards a cardholder may carry at a given time, and may be cumbersome to carry in slim wallets or other card carrying implements. Cardholders have an interest in having an optionality in the thickness of their cards, in addition to an interest of securing the often sensitive cardholder information contained on the transaction cards. However, many present transaction cards are either too heavy, feel insubstantial, and/or fail to adequately secure sensitive cardholder information.

In view of these and other deficiencies in existing transaction cards, solutions are needed for providing optionality in the weight and thickness of transaction cards and improvements in securing cardholder information. The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, payment, transaction, or other cards having a core card component and a weighted card component and related methods are disclosed. The disclosed embodiments may provide a cardholder with cards that may be optionally used in a lighter, thinner configuration, or with a weightier configuration. Furthermore, the weighted card component may add a level of security to the transaction card.

For instance, a transaction card assembly may include: a card body; a Europay, Mastercard and Visa (EMV) chip, visible cardholder information, and a receiving portion disposed on the card body; a weighted card component comprising an attachment portion, the weighted card component being heavier than the card body wherein, in a first configuration, the weighted card component is coupled to the card body via engagement between the receiving portion and the attachment portion, and in a second configuration, the weighted card component is uncoupled from the card body by disengagement between the attachment portion and the receiving portion, and wherein, in the first configuration, the weighted card component obfuscates the EMV chip and the visible cardholder information.

In another example, a transaction card assembly may include a card body comprising a first face and a second face opposite the first face; an EMV chip disposed on the first face of the card body; a magnetic strip disposed on the second face of the card body; a receiving portion formed on the card body; and a weighted card component comprising an attachment portion; wherein, in a first configuration, the weighted card component is coupled to the card body by engagement between the receiving portion and the attachment portion, and in a second configuration, the weighted card component is uncoupled from the card body by disengagement between the attachment portion and the receiving portion, and wherein, in the first configuration, the weighted card component obfuscates a portion of the second face of the card body that does not include the magnetic strip.

In a further example, a method may include: uncoupling a first removable weighted card component from a first card body, the first removable weighted card component comprising a first attachment portion, the first card body including a first EMV chip, a first magnetic strip, a first visible cardholder information, and a first receiving portion, wherein upon uncoupling of the first removable weighted card component, each of the first EMV chip, the first magnetic strip, and the first visible cardholder information are uncovered and the first card body is enabled for active use as tender; and coupling the first removable weighted card component to a second card body, the second card body including a second EMV chip, a second magnetic strip, a second visible cardholder information, and a second receiving portion; such that, when coupled to the second card body, each of the second EMV chip, the second magnetic strip, and the second visible cardholder information are covered and the second card body is disabled for active use as tender.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

Terms like "source," "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" or "cardholder" generally encompasses any person or entity that may desire information, resolution of an issue, purchase of a product, or engage in any other type of interaction with a provider. The term "browser" or "extension" may be used interchangeably with other terms like "program," "electronic application," or the like, and generally encompasses software that is configured to interact with, modify, override, supplement, or operate in conjunction with other software.

In general, the present disclosure is directed to payment, transaction, or other cards and, more particularly, to transaction card assemblies having a removable and replaceable weighted card component. Cardholders may have the optionality of separating their transaction cards into two components: a core card component and a weighted card component. The core card component is thinner and lighter than the weighted card component and may, in an exemplary embodiment, include an EMV chip, an antenna, and optionally a magnetic strip so that the core card component may be usable as tender with or without the weighted card component. The weighted card component is thicker and heavier than the core card component, may be formed of a metal material, and may optionally include a magnetic strip such that it may be also be used as tender with or without the core card component.

Cardholders may use the transaction card either in a coupled (e.g., connected) configuration in which the core card component and the weighted card component are connected to each other, or have the transaction card in an uncoupled (e.g., separated configuration), where the core card component and the weighted card component are separated from each other and each enabled for active use as tender. The two components may be attached and separated in a number of manners, such as by slidable engagement with each other, using magnets to snap the two components to each other, or other modes of engagement and disengagement to be described in more detail below.

In the separated configuration, either one of or both of the core card component and the weighted card component may include elements that make the components usable as tender. For example, the core card component may include an EMV chip, an antenna for touch-free transactions, a magnetic strip, and visible cardholder information. The weighted card component may include a magnetic strip and visible cardholder information. This allows for a cardholder to use just one or the other component of the transaction card, so that only one component is necessary to be included in a cardholder's wallet or other card carrying implement. In some instances, a cardholder may choose to disconnect the lighter, thinner core card component from the weighted card component for ease of carrying the transaction card. In other instances, the cardholder may choose to connect the core card component to the weighted card component for a more substantial weight and heft to the card.

Figure 1A:
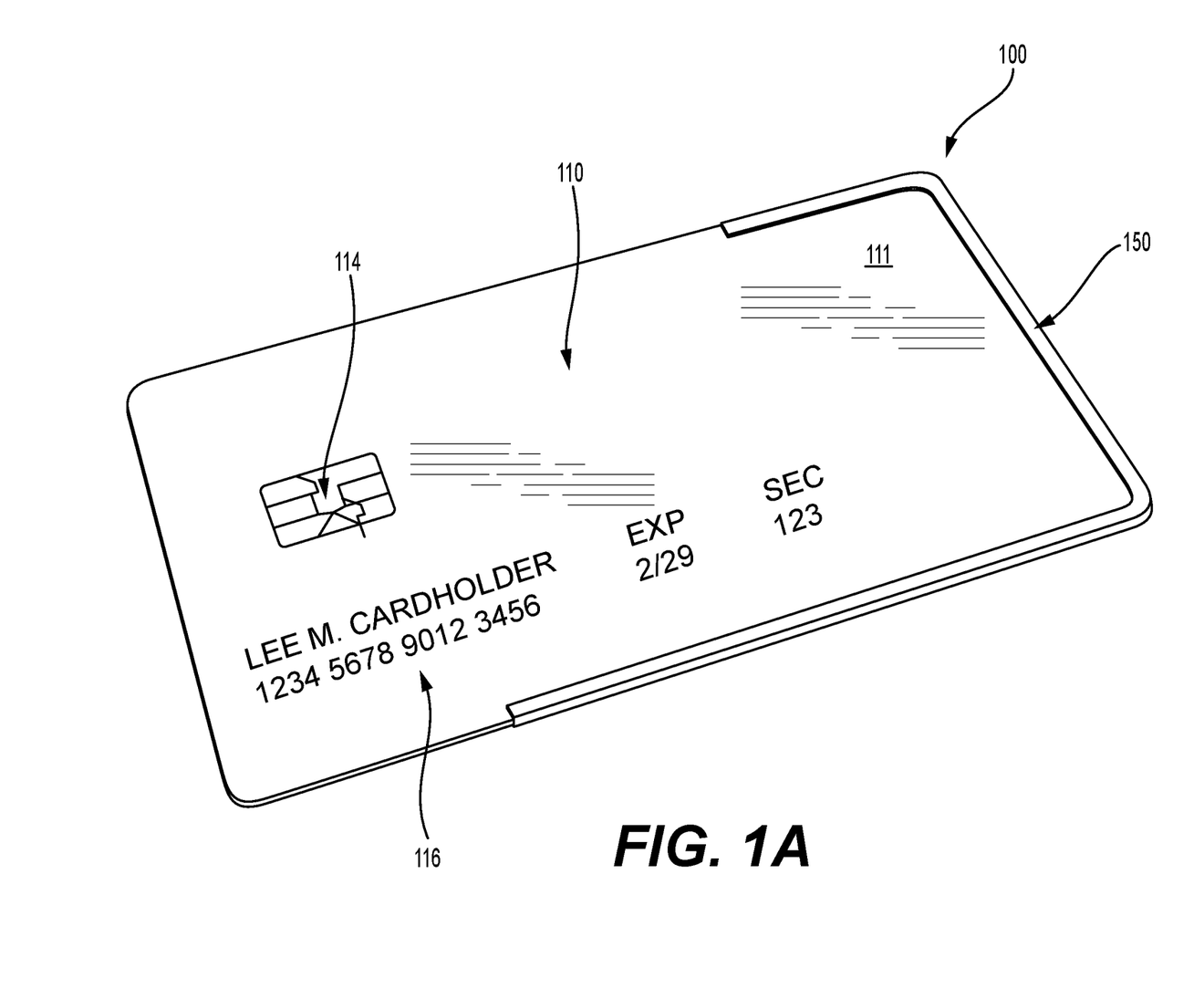
FIG. 1A depicts a front-perspective view of an exemplary transaction card in a coupled configuration, consistent with one or more embodiments of the present disclosure.
Figure 1B:
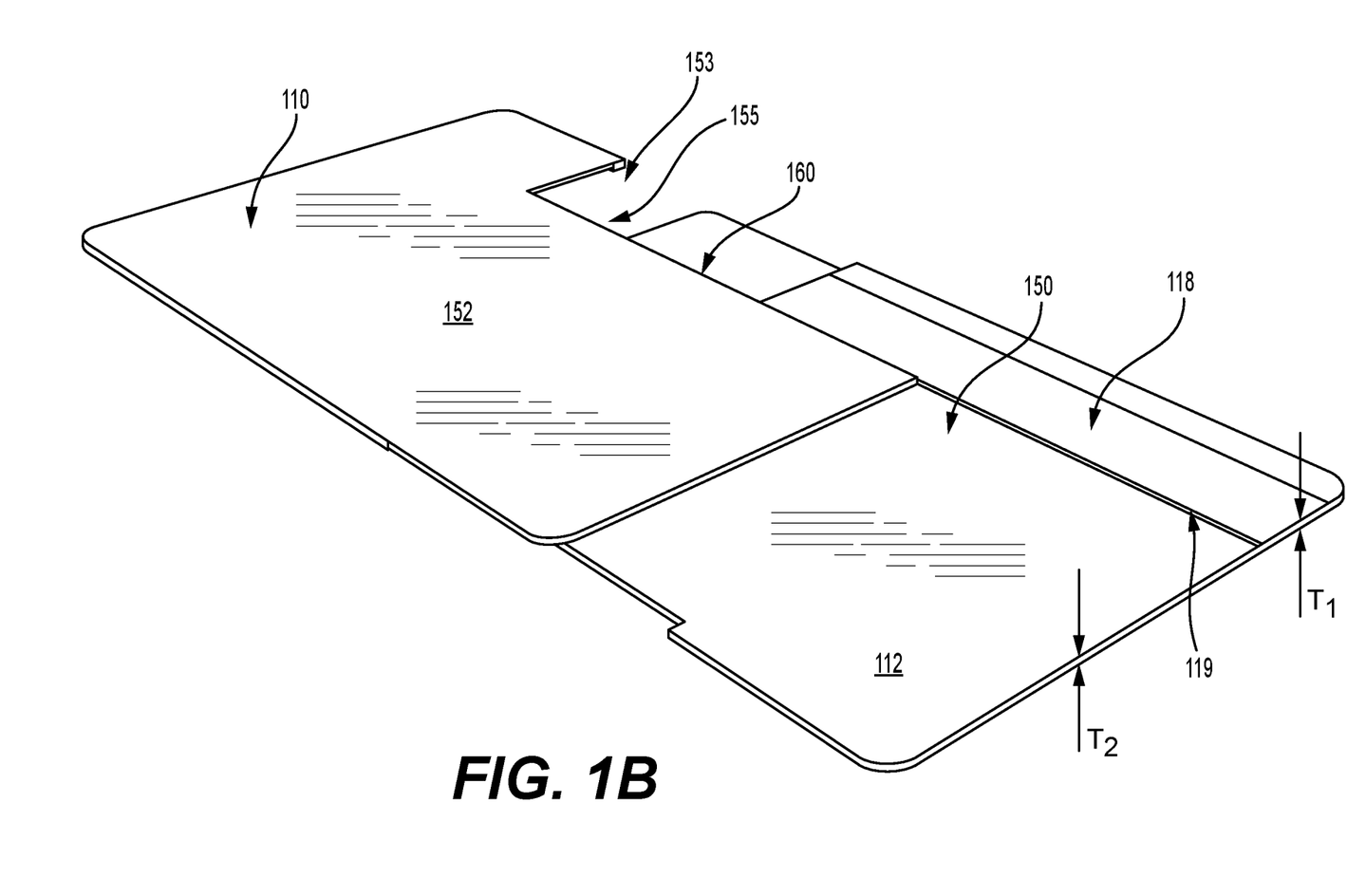
FIG. 1B depicts a rear-perspective view of an exemplary transaction card in a transition between a coupled configuration and an uncoupled configuration, consistent with one or more embodiments of the present disclosure.
Figure 1C:
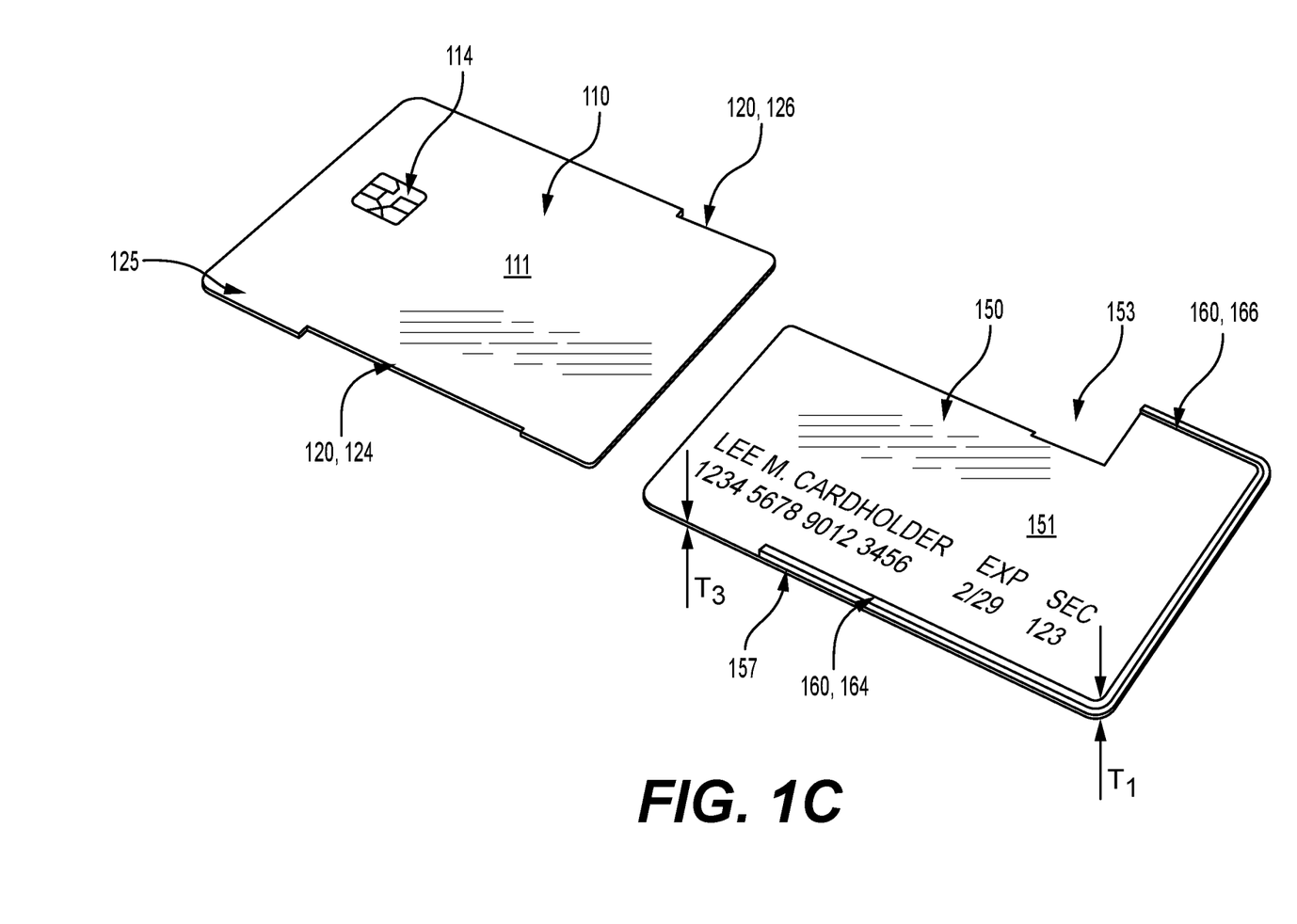
FIG. 1C depicts a front-perspective view of an exemplary transaction card in an uncoupled configuration, consistent with one or more embodiments of the present disclosure.

FIGS. 1A-1C depict an exemplary transaction card 100, consistent with one or more embodiments of the present disclosure. Transaction card 100 may be any physical card product configured to store information, such as financial information (e.g., card numbers, account numbers, etc.), quasi-financial information (e.g., rewards balance, discount information, etc.), information pertaining to a transaction (e.g., transaction status, transaction amount, etc.) and/or individual-identifying information (e.g., name, address, etc.). Examples of transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Accordingly, the term "transaction" should be construed broadly to include any presentation or transfer of information associated with the transaction card.

FIGS. 1A-1C show a transaction card 100 including a core card component 110 (e.g., a card body) and a weighted card component 150. FIG. 1A is a front-perspective view of the transaction card 100 in a coupled configuration and depicts a front face 111 of the core card component 110. In the coupled configuration, core card component 110 and weighted card component 150 are engaged to each other and together form a single transaction card 100.

FIG. 1B is a back-perspective view of the transaction card 100 as core card component 110 and weighted card component 150 are being slidably engaged with or disengaged from each other, and depicts a back face 112 of the core card component 110 and a back face 152 of the weighted card component 150. The back face 112 of the core card component 110 is opposite the front face 111 of the core card component 110, and the back face 152 of the weighted card component 150 is opposite the front face 151 (see FIG. 1C) of the weighted card component 150.

The core card component 110 may be composed of any relatively light-weight, rigid, material, such as a plastic material, and may include thereon an EMV chip 114, visible cardholder information 116 that may include, for example, the cardholder's name, a card number, an expiration date, a CCV number, and/or other elements of information associated with the transaction card 100 or an account associated therewith, an antenna (not shown) for conducting wireless transactions, and a magnetic strip 118. In the exemplary embodiment, the EMV chip 114 is disposed on the front face 111 of core card component 110, and the visible cardholder information 116 and the magnetic strip 118 are located on the back face 112 of the core card component 110. In some embodiments, any of the EMV chip 114, visible cardholder information 116, and magnetic strip 118 may be disposed on either, neither, or both of the front face 111 and back face 112 of the core card component 110.

In the exemplary embodiment shown in FIGS. 1A and 1B, visible cardholder information 116 being disposed on the back face 112 of core card component 110 causes it to be obfuscated by the weighted card component 150 when the core card component 110 and the weighted card component 150 are in the first, coupled configuration shown in FIG. 1A, and the visible cardholder information 116 is uncovered in the second, uncoupled configuration upon removal of the weighted card component 150. In the exemplary embodiment, the EMV chip 114 being disposed on the front face 111 causes it to be visible even in the coupled configuration, and the magnetic strip 118 remains visible even though it is disposed on the back face 112 of core card component 110 by virtue of a cut-out portion 153 formed in the weighted card component formed to correspond to the magnetic strip 118 formed on the core card component 110. The magnetic strip 118 may be less than the full length of the transaction card 100 as shown in FIG. 1B, with the cut-out portion 153 corresponding to and formed to accommodate the length of the magnetic strip 118. In some embodiments, the magnetic strip 118 is between 50% and 100% the length of the transaction card 100. It is to be understood that the shape and dimensions of the cut-out portion 153 may generally correspond to and compliment the shape and dimensions of the magnetic strip 118 such that, in the coupled configuration of FIG. 1A, the magnetic strip 118 and cut-out portion 153 may nest together. In other words, the size, shape, and orientation of the cut-out portion 153 may be selected to correspond to the size, shape, and orientation of the magnetic strip 118, and vice versa.

For example, core card component 110 may include a varied thickness such that a first portion of core card component 110 including the magnetic strip 118 may have a first thickness $T_1$ while a second portion of the core card component 110 excluding the magnetic strip 118 may have a second thickness $T_2$. The first thickness $T_1$ may be thicker than the second thickness $T_2$. As such, an edge surface 119 of the first portion of the core card component 110 (or an edge surface of the magnetic strip 118) may be arranged so as to abut or otherwise contact an edge surface of cut-out portion 153 in the coupled configuration.

In another example, the weighted card component 150 may also have a first portion that may have a first thickness $T_1$ matching the first thickness $T_1$ of the portion of the core card component 110 including the magnetic strip 118, the first portion forming a frame 155 that corresponds to and complements the shape of a lip 125 arranged on the core card component 110, such that in the coupled configuration shown in FIG. 1A, the frame 157 and lip 125 may nest together. In other words, the size, shape, and orientation of the lip 125 may be selected to correspond to the size, shape, and orientation of the frame 157, and vice versa. The remainder of the weighted card component may have a third thickness $T_3$, wherein the first thickness $T_1$ is greater than the third thickness $T_3$, and the second thickness $T_2$ and third thickness $T_3$ together are substantially equal to the first thickness $T_1$.

In some embodiments, the EMV chip 114 may be disposed on the back face 112 of the core card component rather than the front face 111, and the weighted card component 150 may lack the cut-out portion and be substantially rectangular such that it covers the entire back face 112 of the core card component. In such embodiments, in a coupled position, the weighted card component 150 may completely obfuscate all of the EMV chip 114, the visible cardholder information 116, and the magnetic strip 118. The weighted card component 150 may further be comprised of a mesh material of conductive wires for blocking external electromagnetic fields, such that an antenna on the core card component is blocked from communication, disabling the transaction card 100 for use as active tender.

In yet other embodiments, the weighted card component 150 may include a magnetic strip on its back face 152, such that even in the coupled configuration with the magnetic strip 118 of the core card component 110 obfuscated, the transaction card 100 may still be usable as tender based on the exposed magnetic strip of the weighted card component while the remaining elements (EMV chip, antenna, visible cardholder information) are still blocked from the view of potential fraudsters and RFID skimming technologies.

FIG. 1C depicts the core card component 110 and weighted card component 150 in a completely uncoupled configuration. In such a configuration, a cardholder has the option to carry only one of core card component 110 and weighted card component 150, and either or both of them may include elements so that they are usable as tender. As shown in FIG. 1C, core card component 110 may include an EMV chip 114 and visible cardholder information 116 on its front face 111. Not shown in FIG. 1C, magnetic strip 118 may also be located on the back face 112 of the core card component 110 and an antenna may be included to allow for touch-free transactions. The weighted card component 150 may include cardholder information and a magnetic strip (not shown), such that the weighted card component 150 may be usable as tender independently as well. This may be useful in situations in which the core card component becomes lost or misplaced or is otherwise determined not to be used by the cardholder.

Figure 2A:
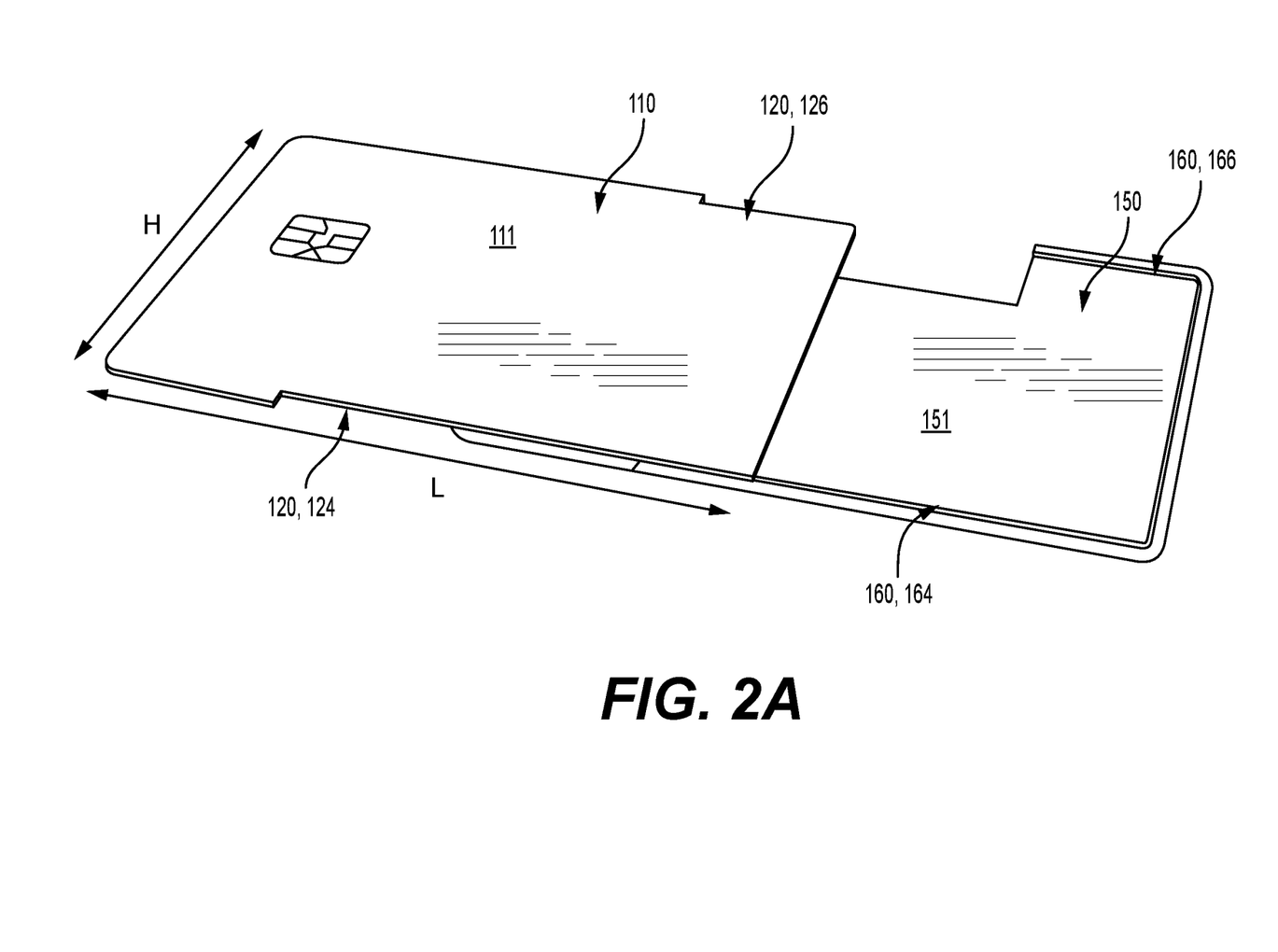
FIG. 2A depicts a front-perspective view of an exemplary transaction card in a transition between a coupled configuration and an uncoupled configuration, consistent with one or more embodiments of the present disclosure.

The core card component 110 and the weighted card component 150 are coupled and uncoupled from each other based on the interaction of a receiving portion 120 disposed on the core card component 110 and an attachment portion 160 disposed on the weighted card component 150. In an exemplary embodiment shown in FIG. 2A, the receiving portion 120 is formed on the core card component 110 and the attachment portion 160 is formed on the weighted card component 150.

The core card component 110 and the weighted card component 150 are both substantially rectangular with a substantially similar height H extending in the vertical direction and a substantially similar length L extending in the horizontal direction perpendicular to the vertical direction, with the length L being greater than the height H. The receiving portion 120 is formed on the horizontal edges 124, 126 of the core card component 110 and includes a groove 122 (see FIG. 2B) formed in a horizontal direction on each of the horizontal edges 124, 126. The attachment portion 160 is formed on the horizontal edges 164, 166 of the weighted card component 150 and includes a respective track 162 (see FIG. 2B) on each of the horizontal edges 164, 166 that is received in a respective groove 122 formed on a respective horizontal edge 124, 126 of the core card component 110.

Figure 2B:
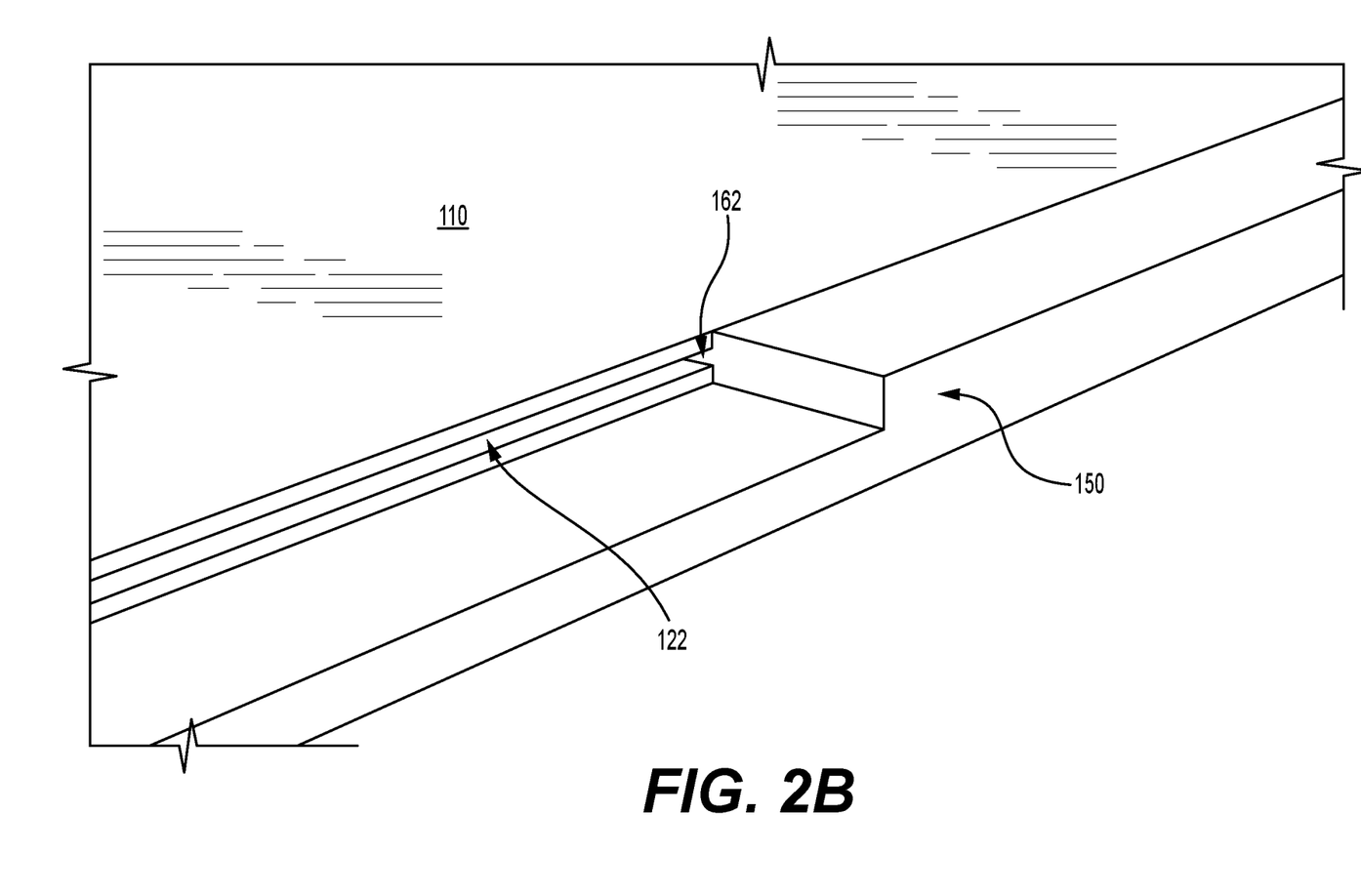
FIG. 2B depicts a view of an attachment portion and a receiving portion of the transaction card, consistent with one or more embodiments of the present disclosure.

As shown in FIG. 2B, track 162 may be inserted into groove 122, allowing attachment portion 160 to engage with receiving portion 120 such that the weighted card component 150 and core card component 110 are slidably movable relative to each other and become slidably engaged with each other. A cardholder may then transition the transaction card 100 between a coupled configuration shown in FIG. 1A and an uncoupled configuration shown in FIG. 1B by sliding the weighted card component 150 and core card component 110 relative to each other as shown in FIGS. 1B and 1C.

In some embodiments, the grooves 122 may be formed on the vertical edges of the core card component and the tracks 162 may be formed on the vertical edges of the weighted card component, such that when the track 162 is inserted into groove 122, allowing attachment portion 160 to engage with receiving portion 120, the weighted card component 150 and core card component 110 become slidably engaged with each other in the vertical direction rather than the horizontal direction.

Figure 2C:
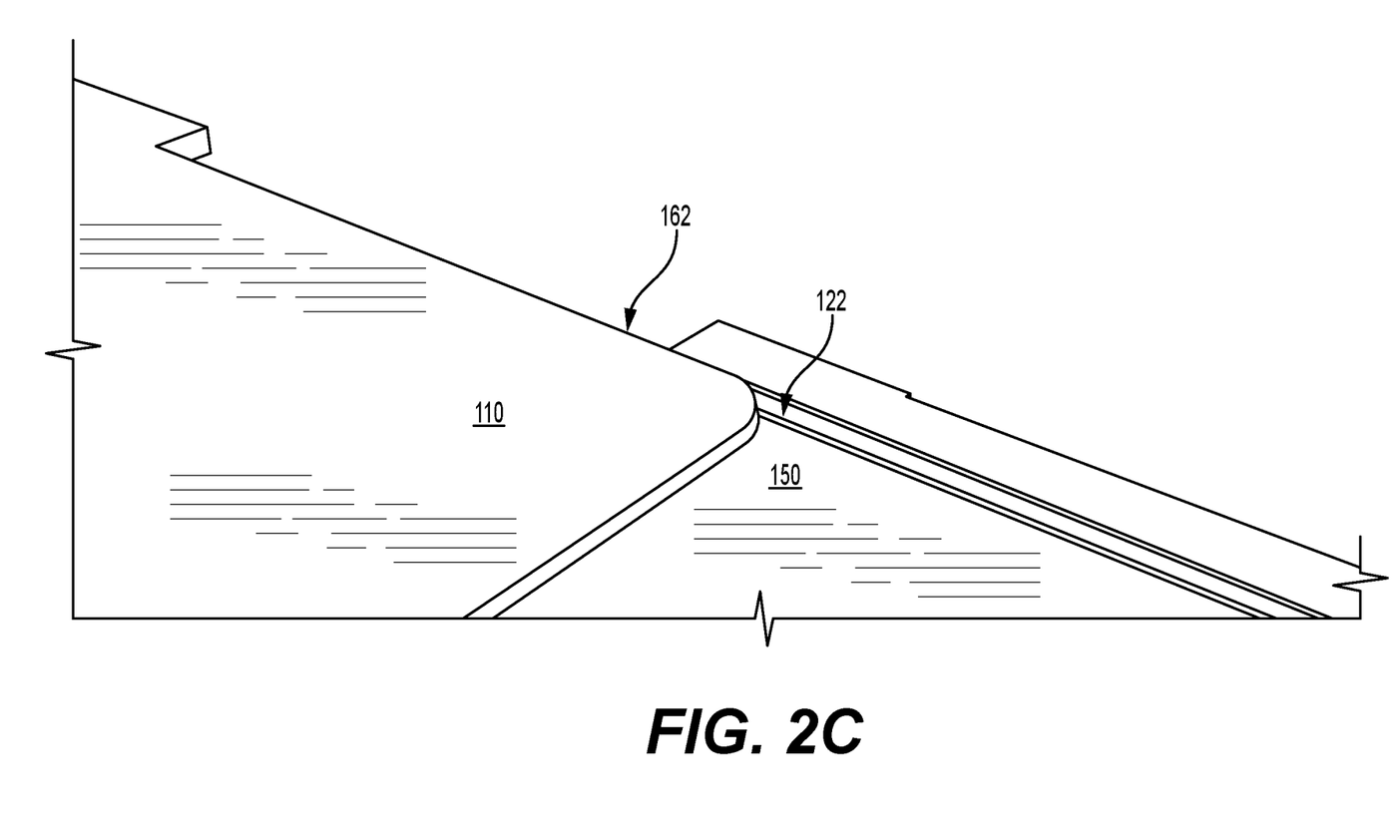
FIG. 2C depicts a view of an attachment portion and a receiving portion of the transaction card, consistent with one or more embodiments of the present disclosure.

In some embodiments shown in FIG. 2C, the grooves 122 may be formed on the weighted card component 150 and the tracks 162 may be formed on the core card component 110. The arrangement is otherwise substantially similar to that of FIG. 2B with the grooves 122 and tracks 162 reversed. Namely, track 162 may be inserted into groove 122, allowing attachment portion 160 to engage with receiving portion 120 such that the weighted card component 150 and core card component 110 become slidably engaged with each other. A cardholder may then transition the transaction card 100 between a coupled configuration shown in FIG. 1A and an uncoupled configuration shown in FIG. 1B by sliding the weighted card component 150 and core card component 110 relative to each other as shown in FIGS. 1B and 1C.

A friction fit allows the weighted card component 150 and the core card component 110 to remain connected to each other in a coupled configuration, requiring at least a small amount of force to separate the two from each other to uncouple the components. In some embodiments, magnetic force may also be used to keep the weighted card component and the core card component in place in the coupled arrangement. The attachment portion 160 may include one or more first magnets, and the receiving portion may include one or more second magnets, and in the first, coupled configuration, the weighted card component 150 may be coupled to the core card component 110 by an attraction between the one or more first magnets and the one or more second magnets.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. In the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A transaction card assembly, comprising:
 a card body;
 an EMV™ chip, visible cardholder information, and a receiving portion disposed on the card body;
 a weighted card component comprising an attachment portion, the weighted card component being heavier than the card body;
  wherein, in a first configuration, the weighted card component is coupled to the card body via engagement between the receiving portion and the attachment portion, and in a second configuration, the weighted card component is uncoupled from the card body by disengagement between the attachment portion and the receiving portion,
  wherein, in the first configuration, the weighted card component obfuscates the visible cardholder information, and
  wherein:
   the attachment portion comprises one or more first magnets;
   the receiving portion comprises one or more second magnets; and
   in the first configuration, the weighted card component is coupled to the card body by an attraction between the one or more first magnets and the one or more second magnets.

2. The transaction card assembly of claim 1, wherein a magnetic strip is disposed on the card body; and
 in the first configuration, the weighted card component obfuscates the magnetic strip and disables the card body for active use as tender.

3. The transaction card assembly of claim 1, wherein a first magnetic strip is disposed on the card body or a second magnetic strip is disposed on the weighted card component; and
 in the first configuration, the weighted card component obfuscates the first magnetic strip.

4. The transaction card assembly of claim 1, wherein
 the card body is substantially rectangular with a height extending in a vertical direction and a length extending in a horizontal direction perpendicular to the vertical direction, wherein the length is greater than the height;

the receiving portion comprises a groove formed in the horizontal direction; and the weighted card component is slidably movable relative to the card body in the horizontal direction.

5. The transaction card assembly of claim 1, wherein the card body is substantially rectangular with a height extending in a vertical direction and a length extending in a horizontal direction perpendicular to the vertical direction, wherein the length is greater than the height;

the receiving portion comprises a groove formed in the vertical direction; and the weighted card component is slidably movable relative to the card body in the vertical direction.

6. The transaction card assembly of claim 5, wherein the attachment portion comprises one or more tracks that are received in the groove of the receiving portion.

7. The transaction card assembly of claim 1, wherein the card body is formed of a rigid plastic material, and the weighted card component is formed of a metal material.

8. The transaction card assembly of claim 1, wherein the weighted card component comprises a mesh material of conductive wires for blocking external electromagnetic fields.

9. A transaction card assembly, comprising:

a card body comprising a first face and a second face opposite the first face;

an EMV™ chip disposed on the first face of the card body;

a magnetic strip disposed on the second face of the card body;

a receiving portion formed on the card body; and a weighted card component comprising visible cardholder information and an attachment portion;

wherein, in a first configuration, the weighted card component is coupled to the card body by engagement between the receiving portion and the attachment portion, and in a second configuration, the weighted card component is uncoupled from the card body by disengagement between the attachment portion and the receiving portion, and the weighted card component is usable as active tender in the second configuration.

10. The transaction card assembly of claim 9, wherein the card body is substantially rectangular with a height extending in a vertical direction and a length extending in a horizontal direction perpendicular to the vertical direction, wherein the length is greater than the height;

the magnetic strip extends less than the length of the card body in the horizontal direction; and the weighted card component includes a cut-out portion to accommodate the magnetic strip, such that the magnetic strip is not obfuscated in the first configuration.

11. The transaction card assembly of claim 9, wherein the card body is substantially rectangular with a height extending in a vertical direction and a length extending in a horizontal direction perpendicular to the vertical direction, wherein the length is greater than the height;

the receiving portion comprises at least one groove formed in the horizontal direction; and the weighted card component is slidably movable relative to the card body in the horizontal direction.

12. The transaction card assembly of claim 9, wherein the card body is substantially rectangular with a height extending in a vertical direction and a length extending in a horizontal direction perpendicular to the vertical direction, wherein the length is greater than the height;

the receiving portion comprises at least one groove formed in the vertical direction; and the weighted card component is slidably movable relative to the card body in the vertical direction.

13. The transaction card assembly of claim 9, wherein the card body is lighter in weight than the weighted card component.

14. The transaction card assembly of claim 9, wherein the card body is formed of a rigid plastic material, and the weighted card component is formed of a metal material.

15. The transaction card assembly of claim 9, wherein the weighted card component comprises a mesh material of conductive wires for blocking external electromagnetic fields.

16. A method, the method comprising:

uncoupling a first removable weighted card component from a first card body, the first removable weighted card component comprising a first attachment portion, the first card body including a first EMV™ chip, a first magnetic strip, a first visible cardholder information, and a first receiving portion, wherein upon uncoupling of the first removable weighted card component, each of the first EMV™ chip, the first magnetic strip, and the first visible cardholder information are uncovered and the first card body is enabled for active use as tender; and coupling the first removable weighted card component to a second card body, the second card body including a second EMV™ chip, a second magnetic strip, a second visible cardholder information, and a second receiving portion;

such that, when coupled to the second card body, each of the second EMV™ chip, the second magnetic strip, and the second visible cardholder information are covered and the second card body is disabled for active use as tender, and wherein a thickness of the first card body at a thickest portion of the first card body is substantially equal to a thickness of a transaction card assembly comprising the first removable weighted card component coupled to the first card body.

17. The method of claim 16, wherein uncoupling the first removable weighted card component from the first card body includes disengaging the first attachment portion from the first receiving portion of the first card body.

18. The method of claim 16, wherein coupling the first removable weighted card component to the second card body includes engaging the first attachment portion to the second receiving portion of the second card body.

19. The method of claim 18, the method further comprising:

coupling a second removable weighted card component to the first card body such that, when coupled to the first card body, each of the first EMV™ chip, the first magnetic strip, and the first visible cardholder information are covered and the first card body is disabled for active use as tender.

* * * * *